(No Model.)
D. W. KING, Jr.
PNEUMATIC TIRE.
No. 541,049. Patented June 11, 1895.
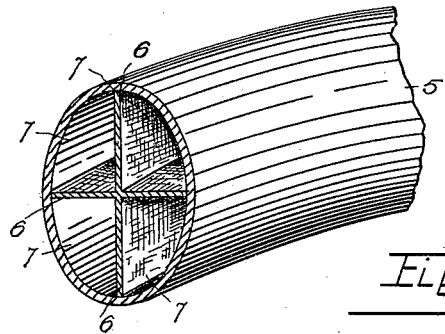
Fig. 1.
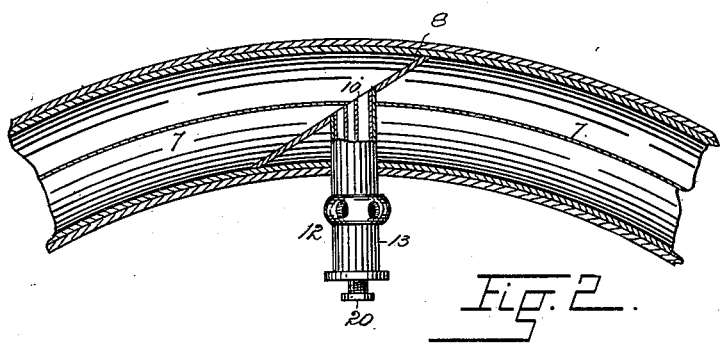
Fig. 2.
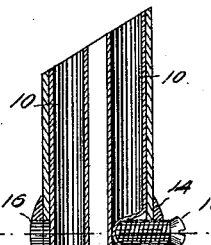
Fig. 3.
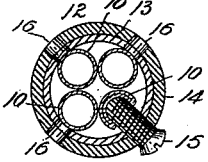
Fig. 4.
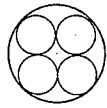
Fig. 6.
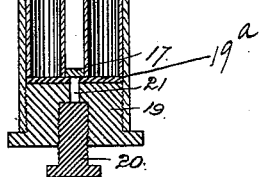
Fig. 5.
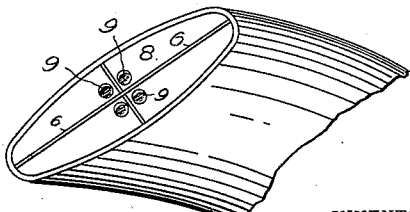
WITNESSES:
G. J. Dollamore
Chas. E. Dawson
INVENTOR
Dean W. King Jr.
BY
A. J. O'Brien
ATTORNEY
THE NORRIS PETERS CO., PHOTO-LITHO., WASHINGTON, D. C.

UNITED STATES PATENT OFFICE.

DEAN W. KING, JR., OF DENVER, COLORADO.

PNEUMATIC TIRE.

SPECIFICATION forming part of Letters Patent No. 541,049, dated June 11, 1895.

Application filed March 3, 1894. Serial No. 502,287. (No model.)

*To all whom it may concern:*

Be it known that I, DEAN W. KING, Jr., a citizen of the United States of America, residing at Denver, in the county of Arapahoe and State of Colorado, have invented certain new and useful Improvements in Pneumatic Tires; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in pneumatic tires, specially designed for bicycles, but which, of course, may be employed to equal advantage in connection with tricycles, and vehicles generally.

My improvement embodies an air tube provided with one or more highly elastic partitions, whereby the tube is divided longitudinally into two or more compartments; and a special construction of valve, whereby air may be conducted to any or all of the compartments, as may be required.

The object of the invention is to overcome the result of a puncture, without stopping to mend the tire. This object is accomplished in my improved tire, by stopping the air passage in the valve leading to the punctured compartment, and then inflating the adjacent compartment, or compartments, until the elastic partition expands under the air pressure to contact with the punctured wall of the tube, or sufficiently to fill the compartment from which the air has escaped by reason of the puncture.

Having thus briefly stated the objects which I expect to accomplish by the use of my improved tire; and having also outlined its structure, the invention will be readily understood by reference to the accompanying drawings in which is illustrated an embodiment thereof.

In the drawings, Figure 1 is a fragmentary cross-sectional view in perspective of my improved air-tube. Fig. 2 is a longitudinal section taken through a portion of the tire, the valve being shown partly in elevation. Fig. 3 is a longitudinal section of the valve, which is shown in detail. Fig. 4 is a cross-section of the valve, taken on the line *x x*, Fig. 3. Fig. 5 is a fragmentary view in perspective of one extremity of the air-tube. Fig. 6 is a detail of construction.

Similar reference characters indicating corresponding parts or elements of the mechanism in these views, let the numeral 5 designate the outer wall of the air tube, and 6 the elastic partitions or diaphragms dividing the tube into four compartments 7.

The tube 5 is provided with a cross partition 8 having apertures 9 communicating with the air conduits 10 of the valve 12 which is suitably attached to the cross-partition. The conduits 10 are elastic and inclosed by a metal shell 13 surrounded by a metallic band 14 apertured to receive stop-screws 15 as shown at 16, which numeral designates said apertures. The upper extremities of the air conduits 10 are connected by a plate 17 apertured as shown at 18 to coincide with the passages in said conduit.

The shell 13 of the valve is interiorly threaded at its upper extremities to receive a screw plug 19 which is correspondingly threaded exteriorly, and shouldered to engage the top of the shell. This plug is further provided with a central recess threaded to receive a screw 20. From this threaded recess, leads an orifice 21 which completes the passage through the plug. The inner extremity of the screw plug is provided with a cushion 19ª formed of some suitable yielding material adapted to press tightly upon the plate 17 and close the upper extremities of air conduits 10 when the plug is screwed down upon the said plate. This cushion is attached to the plug in any suitable manner.

To inflate the tire, the screw 20 is removed, the tip of the air pump inserted, and the screw-plug 19 with its cushion 19ª raised from the plate 17, allowing the air to pass freely from the orifice 21 to all the conduits 10, and thence to the air tube, whereby all its compartments are simultaneously inflated.

If the outer wall of any compartment receives a puncture, the conduit 10 communicating with that compartment is closed by its corresponding stop screw 15. The work of inflation then proceeds as before, except that no air enters the compartment having the punctured wall; while the force of the air entering the one or more remaining compartments, swells the elastic diaphragm, or diaphragms, into the chamber whose air pressure has been reduced to one atmosphere by the puncture. In this manner, the adjoining chamber, or chambers, become enlarged and occupy the space originally forming the chamber of the punctured compartment, whereby the punctured tire is quickly inflated without mending, and with no more trouble than attends inflation before puncture.

Having thus described my invention, what I claim is—

1. In a pneumatic tire, the combination of an air tube having two or more longitudinal compartments separated by elastic diaphragms, and a valve having a separate elastic conduit communicating with each compartment, stop screws inserted in apertures formed in the valve casing and adapted to close the elastic conduits separately, a screw plug inserted in the casing and having a packing on its inner extremity, said plug being adapted to close the outer extremities of all the conduits simultaneously, the screw plug having an aperture whose outer portion is threaded to receive the nipple of an air pump, and a screw for normally closing said aperture in the screw plug, substantially as described.

2. In a pneumatic tire, the combination of an air tube having two or more longitudinal compartments separated by elastic diaphragms, and separate elastic conduits attached to the tube and communicating with the respective longitudinal compartments thereof, and a valve comprising a casing adapted to receive the elastic conduits connected with the air tube, the casing being provided with lateral apertures, screws inserted in the lateral apertures and adapted to engage the elastic conduits, a screw plug inserted in the outer extremity of the valve casing and adapted to close the outer extremities of the elastic conduits, said screw plug being apertured and interiorly threaded, and a screw inserted in said aperture, substantially as described.

In testimony whereof I affix my signature in the presence of two witnesses.

DEAN W. KING, JR.

Witnesses:
G. J. ROLLANDET,
CHAS. E. DAWSON.